April 25, 1939.  C. H. O. WITTIG  2,155,575

BINOCULAR LOUPE

Filed April 24, 1937

CARL H.O. WITTIG
INVENTOR.

BY
ATTORNEYS

Patented Apr. 25, 1939

2,155,575

UNITED STATES PATENT OFFICE 2,155,575

BINOCULAR LOUPE

Carl H. O. Wittig, Irondequoit, N. Y., assignor to Bausch & Lomb Optical Company, Rochester, N. Y., a corporation of New York Application April 24, 1937, Serial No. 138,781

4 Claims. (Cl. 88—41)

The present invention relates to binocular loupes and more particularly to binocular loupes which may be adjusted to the individual wearer.

One of the objects of the present invention is to provide a binocular loupe which may be adjusted to fit the individual wearer. Another object is to provide a binocular loupe in which the lens separation and the nose pad separation are adjustable. A further object is to provide a binocular loupe in which the magnifying lenses may be pivoted out of the way without interfering with the positioning of the eye lenses. These and other objects and advantages reside in certain novel features of construction, arrangement and combination of parts as will hereinafter be more fully set forth and pointed out in the appended claims.

Referring to the drawing.

Figure 1:
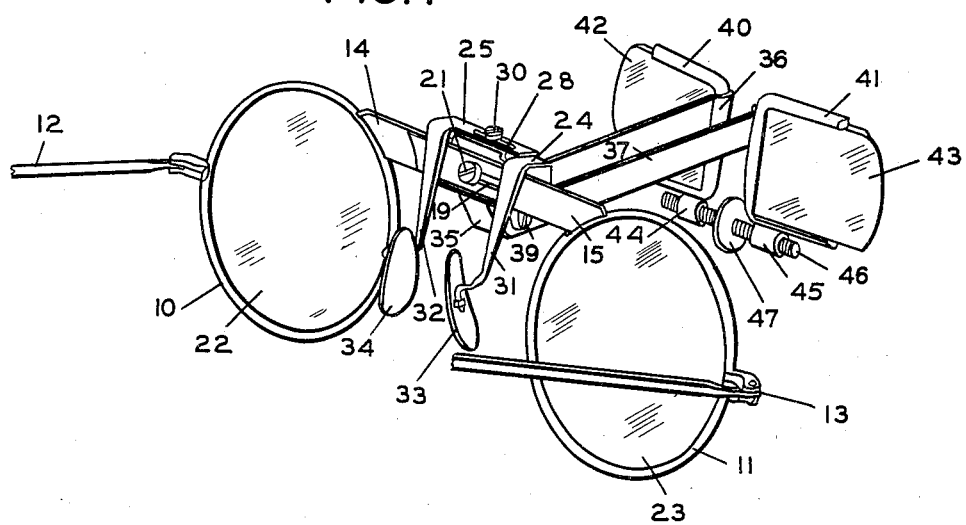
Fig. 1 is a perspective view of a loupe embodying my invention.
Figure 2:
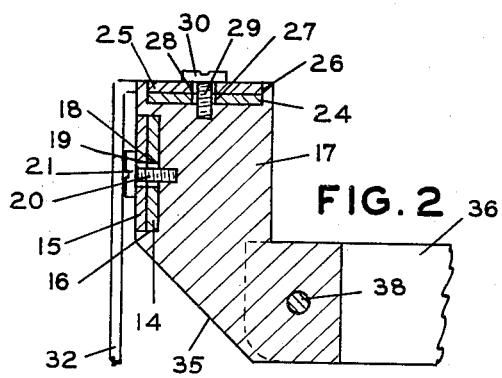
Fig. 2 is a central vertical section through the bridge block.
Figure 3:
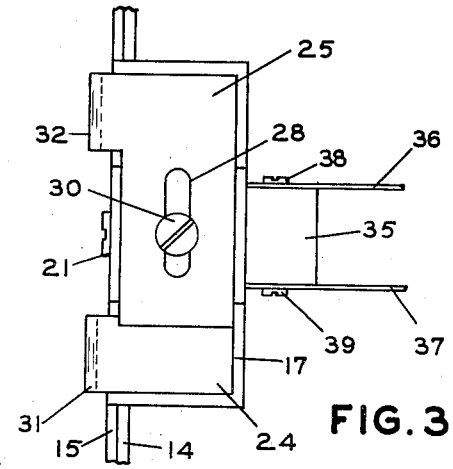
Fig. 3 is a top plan view of the bridge block and connections.
Figure 4:
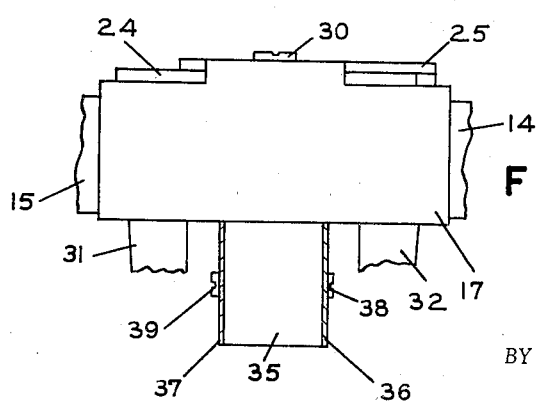
Fig. 4 is a front elevation of the bridge block and connections.

A preferred embodiment of my invention is illustrated in the drawing wherein 10 and 11 designate eyewires to which are secured temples 12 and 13, respectively. Two bars 14 and 15 extend from the nasal sides of the eyewires 10 and 11, respectively, and are slidably received in a recess 16 in the rear of the bridge block 17. The bars 14 and 15 are provided with slots 18 and 19, respectively, and a screw 20 having an enlarged head 21 extends through the slots 18 and 19 and is threaded into the bridge block 17. The eyewires 10 and 11 are formed to receive ophthalmic lenses 22 and 23, respectively. These lenses 22 and 23 may be, and usually are, the wearer's ordinary corrective lenses. The connection between the bars 14 and 15 and the bridge block 17 permits the separation of the lenses 22 and 23 to suit the wearer's interpupillary distance and the bars may be locked in adjusted position by the screw 20.

A second pair of bars 24 and 25 are slidably mounted in a recess 26 in the upper surface of the bridge block 17. These bars 24 and 25 are provided with slots 27 and 28, respectively, and a screw 29 having an enlarged head 30 extends through the slots 27 and 28 and is threaded into the bridge block 17. Two pad arms 31 and 32, carrying nose pads 33 and 34, respectively, are rigidly secured to the bars 24 and 25, respectively. By moving the bars 24 and 25, the separation between the nose pads 33 and 34 may be varied to fit the wearer's nose and the pads may be locked in position by means of the set screw 29.

A projection 35 extends downwardly and forwardly from the lower surface of the bridge block 17 and forwardly extending arms 36 and 37 are pivotally secured one on each side of the projection 35 by screws 38 and 39, respectively. These arms 36 and 37 extend rearwardly beyond the front face of the bridge block 17 so that in operative position, the arms 36 and 37 engage the lower surface of the bridge block as a stop while in inoperative position they engage the front surface of the bridge block as a limiting stop. The arms 36 and 37 are of resilient material and carry at their outer ends lens holders 40 and 41, respectively, within which are mounted the magnifying lenses 42 and 43, respectively. Nuts 44 and 45 are secured to the bottom of lens holders 40 and 41, respectively, and are tapped right and left hand to receive the right and left hand screw 46. A knurled knob 47 on the screw 46 provides a convenient and accessible means for rotating the screw to vary the separation between the lenses 42 and 43.

From the foregoing, it will be apparent that I am able to attain the objects of my invention and provide a new and improved binocular loupe which can be adjusted to fit the individual wearer. While the invention has been illustrated with ophthalmic lenses positioned in the eyewires, it is obvious that these eyewires could be left empty and the loupe worn over ordinary spectacles. Various other changes could, of course, be made without departing from the spirit of my invention or the scope of the appended claims.

I claim:

1. A binocular loupe comprising a block, a pair of eyewires, a bar extending from the nasal side of each eyewire, means for slidably securing said bars to said block whereby the distance between said eyewires may be vared, a pair of pad arms, a nose pad at one end of each pad arm, a second bar at the other end of each pad arm, means for slidably securing said second bars to said block whereby the space between said nose pads can be varied, a support secured on the front end of said block and projecting forwardly therefrom and a pair of magnifying lenses secured on the outer end of said support.

2. A binocular loupe comprising a block, a pair of eyewires, a bar extending from the nasal side of each eyewire, means for slidably securing said bars to said block whereby the distance between said eyewires may be varied, a pair of pad arms, a nose pad at one end of each pad arm, a second bar at the other end of each pad arm, means for slidably securing said second bars to said block whereby the space between said nose pads can be varied, a support pivotally secured on the front end of said block and projecting forwardly therefrom for pivotal movement in a plane perpendicular to the plane of the optical axes and a pair of magnifying lenses secured on the outer end of said support.

3. A binocular loupe comprising a bracket, two eyewires, means for slidably connecting said eyewires to said bracket so that they may be adjustably moved toward or from each other, a temple on each eyewire, two pad arms, means for slidably mounting said pad arms on said bracket for adjustment toward or from each other, means for securing said pad arms in adjusted position, a nose pad on each pad arm, two arms pivotally mounted on said bracket and extending forwardly therefrom, a magnifying lens on each arm and means for varying the axial separation of said lenses.

4. A binocular loupe comprising two eyewires, means on each eyewire for holding an ophthalmic lens, a temple on each eyewire, a bar extending from the nasal side of each eyewire, a block, means for slidably securing said bars to said block so that the spacing between the eyewires may be varied for different interpupillary distances, means for locking said bars in adjusted position on said block, two pad arms, a nose pad on each pad arm, a second bar on each pad arm, means for slidably securing the second bars on said block so that the spacing between the nose pads may be varied for different widths of nose, means for locking the second pair of bars in adjusted position on said block, a projection on said block, support means pivotally mounted on said projection and extending forwardly therefrom, and a pair of magnifying lenses carried at the forward end of said support means in alignment with said eyewires.

CARL H. O. WITTIG.